United States Patent
Reusche et al.

(10) Patent No.: US 9,206,934 B2
(45) Date of Patent: Dec. 8, 2015

(54) HEATED HOSE ASSEMBLY

(71) Applicant: Miller Manufacturing Company, Eagan, MN (US)

(72) Inventors: Thomas K. Reusche, Elburn, IL (US); T. Bruce Slamans, Sugar Grove, IL (US); Philip E. Chumbley, Aurora, IL (US)

(73) Assignee: Miller Manufacturing Company, Eagan, MN (US)

( * ) Notice: Subject to any disclaimer, the term of this patent is extended or adjusted under 35 U.S.C. 154(b) by 183 days.

(21) Appl. No.: 14/089,297

(22) Filed: Nov. 25, 2013

(65) Prior Publication Data
US 2015/0144217 A1    May 28, 2015

(51) Int. Cl.
*F16L 11/12* (2006.01)
*F16L 53/00* (2006.01)

(52) U.S. Cl.
CPC ............... *F16L 53/008* (2013.01); *F16L 11/12* (2013.01)

(58) Field of Classification Search
CPC ............... E03B 7/10; E03B 7/12; E03B 7/14; H05B 3/56; F16L 53/008
USPC ............... 138/33, 109; 392/489, 468; 174/47; 285/41
See application file for complete search history.

(56) References Cited

U.S. PATENT DOCUMENTS

| | | | |
|---|---|---|---|
| 1,474,528 A | 11/1923 | Hurst | |
| 3,378,673 A | 4/1968 | Hopper | |
| 3,519,023 A | 7/1970 | Burns | |
| 3,754,118 A | 8/1973 | Booker | |
| 4,214,147 A | 7/1980 | Kraver | |
| 4,423,311 A | 12/1983 | Varney | |
| 5,859,953 A | 1/1999 | Nickless | |
| 5,933,574 A | 8/1999 | Avansino | |
| 5,975,119 A | 11/1999 | Silva | |
| 6,727,481 B1 | 4/2004 | Wilds | |
| 7,721,766 B2 | 5/2010 | Sawada | |
| 8,028,721 B2 | 10/2011 | Koskey | |
| 8,291,939 B2 | 10/2012 | Ferrone | |
| 2007/0036528 A1 | 2/2007 | Ferrone | |
| 2008/0271801 A1 | 11/2008 | Sonderegger | |
| 2009/0242062 A1* | 10/2009 | Sawada | 138/32 |
| 2009/0266435 A1 | 10/2009 | Ferrone | |

* cited by examiner

*Primary Examiner* — Patrick F Brinson
(74) *Attorney, Agent, or Firm* — Briggs and Morgan, P.A.

(57) ABSTRACT

A heated hose assembly may include a flexible hose and a heating element. The flexible hose defines an internal water channel and includes first and second hose couplings secured to first and second ends, respectively. The first end is opposite the second end. The heating element extends from the first hose coupling to the second hose coupling through the flexible hose. The heating element is configured to heat the first and second hose couplings and the flexible hose.

12 Claims, 4 Drawing Sheets

HEATED HOSE ASSEMBLY

FIELD OF THE DISCLOSURE

Embodiments of the present disclosure generally relate to hose assemblies, and, more particularly, to heated hose assemblies.

BACKGROUND OF THE DISCLOSURE

In various settings, individuals may desire to channel water from a water source, such as a well, faucet, or the like, to an outdoor location while the ambient temperature is below freezing. For example, a farmer may use a hose to supply water to a stock tank in order to provide drinking water for livestock. As another example, a hose may be used to refill water tanks in a recreational vehicle. Any water that remains within an idle hose and exposed to freezing temperatures will likely freeze, thereby forming a barrier within the hose, or even damaging the hose, such as through bursting or splitting. Even if water is not present within the idle hose, the hose typically becomes stiff and unwieldy when exposed to freezing conditions.

In order to prevent hoses from freezing or becoming difficult to handle, heated garden hoses have been developed. For example, a known heated hose includes a flexible hose having a heating cable within an internal water channel. The heating cable connects to source of power through an unheated pipe section.

Another known heated hose includes a heating element extending along the length of the hose. As yet another example, a heated hose includes a heated conduit system in which part of the system employs a heating element positioned between inner and outer tubes of a flexible hose. Still another known heated hose includes heat tape between inner and outer tubes of the hose. Another example of a known heated hose includes a ground wire running through a hose.

In general, various known heated hoses apply heat to a flexible hose in order to either heat the fluid passing through the hose, or prevent it from freezing. However, typical heated hoses are susceptible to freezing at either end due to unheated metal couplings. As such, water may freeze within or proximate to the metal couplings, thereby forming ice plugs that prevent water from passing. Indeed, the ice formed within or proximate to the metal couplings may damage the flexible hose or even the metal couplings.

SUMMARY OF EMBODIMENTS OF THE PRESENT DISCLOSURE

Certain embodiments of the present disclosure provide a heated hose assembly that may include a flexible hose and a heating element. The flexible hose may define an internal water channel and include first and second hose couplings secured to first and second ends, respectively. The first end is opposite the second end. The heating element may extend from the first hose coupling to the second hose coupling through the flexible hose. The heating element is configured to heat the first and second hose couplings and the flexible hose.

The heated hose assembly may also include a heating element introducer secured to one of the first or second hose couplings. The heating element introducer introduces the heating element into the flexible hose. In at least one embodiment, the heating element extends through at least a portion of the heating element introducer. As such, the heating element may also be configured to heat the heating element introducer.

The heating element introducer may include a main body and first and second introducer couplings. The first introducer coupling may removably secure to the second hose coupling to securely connect the heating element introducer to the flexible hose. The second introducer coupling may be configured to securely connect to a source of water.

The heating element may have an interior heating wire covered by an extruded cover. The heating element may include an introducing lead wire segment within the heating element introducer. The introducing lead wire segment is configured to heat the heating element introducer.

The heating element may also include an introducing coupling segment that passes through the first hose coupling. The introducing coupling segment is configured to heat the first hose coupling.

The heating element may also include a hose extension segment that passes through the flexible hose. The hose extension segment is configured to heat the flexible hose.

The heating element may also include a coupling loop segment secured proximate to or within the second hose coupling. The coupling loop segment is configured to heat the second hose coupling.

The heating element may also include a hose return segment that passes through the flexible hose. The hose return segment is configured to heat the flexible hose.

The heating element may also include a coupling return segment that passes through the first hose coupling. The coupling return segment is configured to heat the first hose coupling.

The heating element may also include a lead wire return segment within the heating element introducer. The lead wire return segment is configured to heat the heating element introducer.

The assembly may also include a first restraint within the second hose coupling. The coupling loop segment may loop around the first restraint. The first restraint may include a linear longitudinal pin that spans an inner diameter of the second hose coupling.

The assembly may also include a second restraint secured proximate to an introducer coupling of the heating element introducer. The lead wire return segment may loop around the second restraint. The second restraint may include a hook that spans an inner diameter of the introducer coupling.

Certain embodiments of the present disclosure provide a heated hose assembly that may include a flexible hose defining an internal water channel and including at least one hose coupling secured to one of first or second ends of the flexible hose, wherein the first end is opposite the second end. A heating element may extend through the flexible hose from the first end to the second end. The heating element is configured to heat the hose coupling(s) and the flexible hose.

The heated hose assembly may also include a heating element introducer secured to one of the at least one hose coupling or one of the first or second ends of the flexible hose. The heating element introducer introduces the heating element into the flexible hose.

Figure 1:
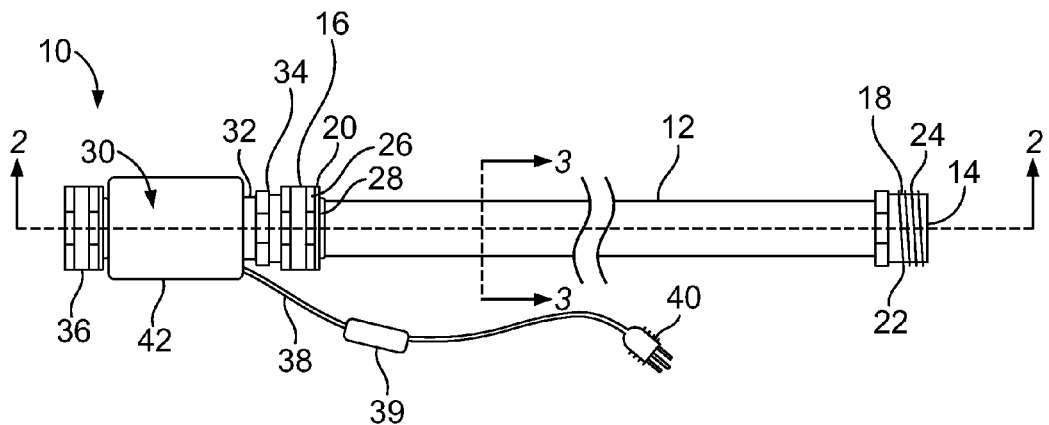
FIG. 1 illustrates a lateral view of a heated hose assembly, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE DRAWINGS

Embodiments of the present disclosure provide heated hose assemblies that may include a heating element introducer that introduces a heating element into a flexible hose. The heating element extends from a first end of the flexible hose, such as from an input coupler or coupling, to a second end of the flexible hose, such as to an outlet coupler or coupling. As such, the heating element is configured to heat an entire length of the flexible hose, including input and output couplings.

FIG. 1 illustrates a lateral view of a heated hose assembly 10, according to an embodiment of the present disclosure. The heated hose assembly 10 includes a flexible hose 12, such as a garden hose, that defines an internal water channel (not shown in FIG. 1) that extends between openings at either end 14 and 16. A first hose connector or coupling 18, such as a male coupling, is connected to the end 14 of the flexible hose 12. A second hose connector or coupling 20, such as a female coupling, is connected to the end 16 of the flexible hose 12. It is to be understood that the terms first and second within the disclosure are general terms that merely indicate a number of couplings, for example. While described as the "first hose coupling 18" and the "second hose coupling 20," the terms may be changed so as to refer to a first hose coupling 20 and a second hose coupling 18.

The first hose coupling 18 may be formed of a rigid material, such as metal, plastic, glass, or ceramic, and may include an outer circumferential body 22 having external threads 24. The outer circumferential body 22 may connect to a stem (not shown in FIG. 1) that extends into the flexible hose 12. The outer circumferential body 22 and the stem define an internal passage that connects to the opening formed through the flexible hose 12. Accordingly, water may pass between the internal passage of the first hose coupling 18 and the internal water channel formed through the flexible hose 12. The external threads 24 are configured to threadably engage and secure to a reciprocal female coupling, such as may be found on a faucet or a spray nozzle, for example.

The second hose coupling 20 may also be formed of a rigid material, such as metal, and may include an outer rotatable body 26 rotatably secured to a fixed stem 28 that is secured into the end 16 of the flexible hose 12. The outer rotatable body 26 includes internal threads (not shown in FIG. 1) and defines an internal passage that connects to the opening formed through the flexible hose 12 through the fixed stem 28. As such, water may pass between the internal passage of the second hose coupling 18 and the internal water channel formed through the flexible hose 12. The internal threads are configured to threadably engage and secure to a reciprocal male coupling, such as may be found an a faucet or spray nozzle, for example.

Alternatively, the first hose coupling 18 may be a female coupling, while the second hose coupling 20 may be a male coupling. Also, alternatively, both the first and second hose couplings 18 and 20 may be male or female couplings.

A heating element introducer 30 is removably secured to the end 16 of the flexible hose 12. The heating element introducer 30 includes a main body 32 having a first introducer connector or coupling 34 that threadably secures to the second hose coupling 20 of the flexible hose 12. For example, the first introducer coupling 34 may be a male coupling that threadably secures into the second hose coupling 20, which may be a reciprocal female coupling. Alternatively, the first introducer coupling 34 may be a female coupling, while the second hose coupling 20 may be a male coupling. Also, alternatively, instead of a separate and distinct introducer coupling 34, the heating element introducer 30 may integrally connect to the second hose coupling 20. The heating element introducer 30 may be a permanent, fixed portion of the flexible hose 12. For example, the second hose coupling 20 may be permanently connected to both an end of the flexible hose 12 and the heating element introducer 30. Also, a separate and distinct coupling may not be disposed between the end of the flexible hose 12 and the heating element introducer 30. Instead, an end of the flexible hose 12 may integrally and permanently connect to the heating element introducer 30 without the use of a separate and distinct coupling.

The main body 32 may also include a second introducer connector or coupling 36 at an opposite end from the first introducer coupling 34. The second introducer coupling 36 may be configured to removably secure to a source of water, such as a faucet or spigot. As shown in FIG. 1, the second introducer coupling 36 may be a female coupling. Alternatively, the second introducer coupling 36 may be a male coupling.

The main body 32 may be formed of a stiff, rigid material, such as metal, plastic, or the like. The main body 32 may be stiff and rigid in comparison to the flexible hose 12. For example, while the flexible hose 12, such as a standard garden hose, may be bent, curved, and kinked, the main body 32 may resist bending, curving, and kinking. Indeed, the main body 32 may be formed of a material, such as metal or stiff plastic, that is incapable of being bent, curved, or kinked.

One or more lead wires 38 pass into the main body 32 and connect to heating elements (not shown in FIG. 1) that extend through the flexible hose 12 and the heating element introducer 30. The lead wire 38 is, in turn, connected to a plug 40 that is configured to be removably connected to a source of electrical power, such as a standard electrical outlet. As such, electrical power may be supplied to the heating element by way of the lead wire 38. Alternatively, instead of a plug and lead wire, the heated hose assembly 10 may include a battery connected to the heating element. As such, the heating element may be operated through battery power. It is to be understood that the lead wires 38 may include portions of the heating element(s) that connect to wires in a power cord that are configured to provide power to the heating element(s). The lead wires 38 may be part of conductive wires extending from the power cord, and/or may be part of the heating element(s).

A protective cover 42 may cover the main body 32. The protective cover 42 may be formed of polyvinyl chloride (PVC) and may define a chamber that may contain potting material, such an epoxy potting, and may insulate and protect the main body 32. The protective cover 42 may also add stiffness and rigidity to the heating element introducer 30. The protective cover 42 may protect the electrical connections within the main body 32 from shorting, for example.

A thermostat 39 may be electrically connected to the lead wire 38. For example, the thermostat 39 may be wired in series with the lead wire 38. The thermostat 39 may be set to activate the heating element a few degrees above freezing. The thermostat 39 may deactivate the heating element when a safe temperature above the freezing point is detected.

Figure 2:
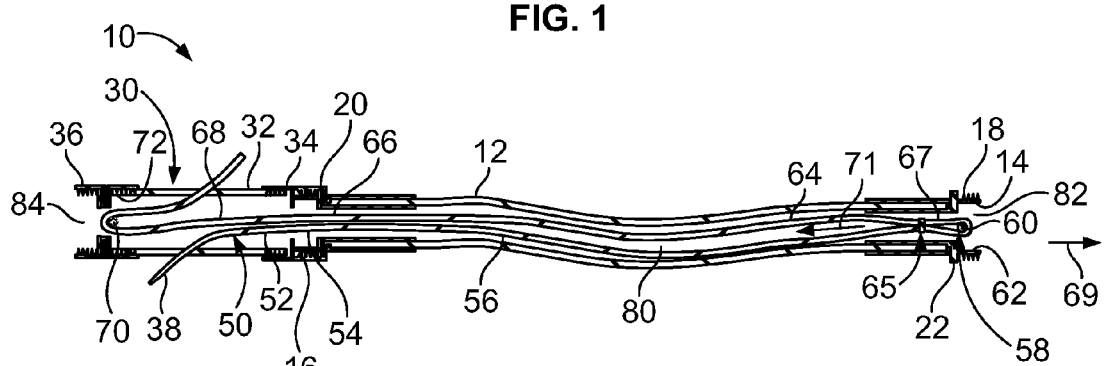
FIG. 2 illustrates a transverse cross-sectional view of a heated hose assembly through line 2-2 of FIG. 1, according to an embodiment of the present disclosure.

FIG. 2 illustrates a transverse cross-sectional view of the heated hose assembly 10 through line 2-2 of FIG. 1, according to an embodiment of the present disclosure. For the sake of clarity, the protective cover 42 and the plug 40 are not shown in FIG. 2.

As shown in FIG. 2, the lead wire 38 enters the main body 32, such as through a small opening. A sealing adhesive may be positioned around the lead wire 38 at the opening. The lead wire 38 connects to a flexible heating element 50. The heating element 50 may be or include a conductive wire that generates heat when connected to a source of electrical power. The conductive wire may be encased in a flexible extruded cover, which may be formed of a plastic having a high melting point.

The heating element 50 includes an introducing lead wire segment 52 that directly connects to the lead wire 38 and passes from the main body 32 into the second hose coupling 20 of the flexible hose 12. As such, the lead wire segment 52 integrally connects to an introducing coupling segment 54 that passes through the second hose coupling 20. The introducing coupling segment 54 passes through the second hose coupling 20 and connects to an hose extension segment 56 that passes through an entire length of the flexible hose 12 from the second hose coupling 20 to the first hose coupling 18.

The hose extension segment 56 integrally connects to a coupling loop segment 58 that loops around a restraint 60 that may span an inner diameter 62 of the first hose coupling 18. The coupling loop segment 58 loops back 180 degrees and integrally connects to a hose return segment 64 that extends from the entire length of the flexible hose 12 from the first hose coupling 18 back to the second hose coupling 20. As shown in FIG. 2, a securing member 65, such as a wire tie, securely ties portions of the hose extension segment 56 and the hose return segment 64 together, thereby forming a securing loop 67 that secures around the restraint 60.

The securing loop 67 is prevented from ejecting out of the end 14 by the securing loop 67 being secured on the restraint 60. That is, if the securing loop 67 starts to move in the direction of arrow 69, further movement is halted by the securing member 65 (such as a wire tie) abutting into the restraint 60. Similarly, the securing loop 67 is prevented from retreating back into the flexible hose 12 in the direction of arrow 71 by the securing loop 67 being secured on the restraint 60. For example, the securing loop 67 loops around the restraint 60, which resists retreating movement of the securing loop 67 in the direction of arrow 71.

The restraint 60 may be a linear longitudinal pin that spans across the inner diameter 62 of the first coupling 14. For example, the restraint may be a pin that is securely bonded to inner wall portions of the first coupling 14. Optionally, the restraint 60 may have a length that is greater than that of the inner diameter 62. In such an embodiment, the restraint 60 may be resilient and may be compressed or bent during a manufacturing process when inserted into the first coupling 14. At the desired position, the restraint 60 may flex back to an at-rest position and securely lodged within the first coupling 14.

The hose return segment 64, in turn, integrally connects to a coupling return segment 66 that passes through the second hose coupling 20. The coupling return segment 66, in turn, integrally connects to a lead wire return segment 68 that loops around a restraint 70 that spans an inner diameter 72 of the main body 32. The restraint 70 may be similar to the restraint 60 described above. Optionally, one or both of the restraints 60 and 70 may be other types of restraints, such as S-hooks, rings, or the like. Also, optionally, a securing member, such as a wire tie, may be used to form a tight securing loop around the restraint 70.

The lead wire return segment 68 may connect to the lead wire 38 or a separate and distinct lead wire. Alternatively, the lead wire return segment 68 may simply be a loose end of the heating element 50 that is secured to the main body 32, for example.

The heating element 50 may be prevented from slacking into the flexible hose 12 by the restraints 60 and 70. The restraints 60 and 70 may suspend the heating element 50 within the assembly 10 at a desired tautness. For example, the heating element 50 may be held between the restraints 60 and 70 such that segments lie against wall portions of the flexible hose 12. Alternatively, the heating element 50 may be held tighter such that at least portions are centered within the flexible hose 12.

As shown, the heating element 50 extends through an entire length of the flexible hose 12 and into both the first and second hose couplings 18 and 20. Further, the heating element 50 extends through the main body 32 of the heating element introducer 30 from the first introducer coupling 34 to the second introducer coupling 36. The heating element 50 is positioned within a water channel 80 defined through the heating element introducer 30 and the flexible hose 12. As such, the heating element 50 is configured to heat water within the water channel 80 as well as the heating element introducer 30 and the flexible hose 12. Water may flow through the heating element introducer 30 into the flexible hose 12 and out through an outlet 82 at the end 14.

The heating element introducer 30 is connected to an end of the flexible hose 12. As shown in FIG. 2, the heating element introducer 30 is connected to the end 16 of the flexible hose 12, which may be in inlet configured to allow water to pass therein. Alternatively, the heating element introducer 30 may be positioned at an outlet of the flexible hose 12. For example, water may pass into the water channel 80 through the end 14 and pass out of the assembly 10 through an open end 84 of the heating element introducer 30.

The heating element 50 may be a single, unitary structure having the various segments described above. That is, the heating element 50 may include a single, unitary heating wire that is encased in the protective, flexible extrusion, as described above. Additionally, embodiments of the present disclosure may include a ground wire that runs parallel to at least portions of the heating element 50.

In operation, the plug 40 (shown in FIG. 1) is plugged into a source of electrical power, thereby energizing the heating element 50. The heating element 50 generates heat and provides the heat to the various portions of the heated hose assembly 10. The introducing lead wire segment 52 and the lead wire return segment 68 heat the main body 32, as well as the first and second couplings 34 and 36 of the heating element introducer 30. Notably, the first and second couplings 34 and 36 may be formed of a heat-conductive material, such as metal. Thus, as shown in FIG. 2, the lead wire return segment 68 may heat an end of the second introducer coupling 36. As the end of the second introducer coupling 36 is heated, the heat is transferred to the entire body of the second introducer coupling 36. The lead wire return segment 68 may extend further into the second introducer coupling 36 than shown.

The introducing coupling section 54 and the coupling return segment 66 heat the second hose coupling 20 of the flexible hose 12. The hose extension segment 56 and the hose return segment 64 heat the length of the flexible hose 12. The coupling loop segment 58 heats the first hose coupling 18 of the flexible hose 12. As such, an entire length of the heated hose assembly 10 is heated through the heating element 50, including the hose couplings 18 and 20, as well as the heating element introducer 30.

Looping the heating element 50 around the restraints 60 and 70 at the ends of the assembly 10 allows the heating element 50 to extend into the first and second hose couplings 18 and 20 of the flexible hose 12. Because the first and second couplings 18 and 20 may be formed of metal, which transfers heat quickly, heating a portion of each of the couplings 18 and 20 provides heat to an entirety of each hose coupling 18 and 20.

Figure 3:
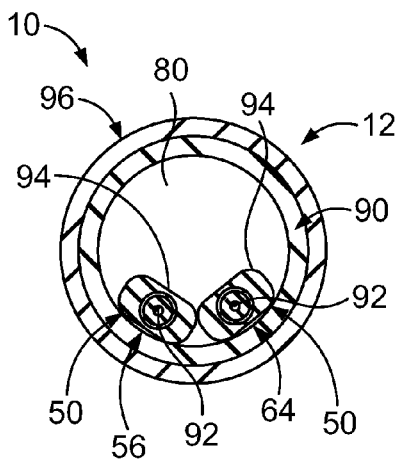
FIG. 3 illustrates an axial cross-sectional view of a heated hose assembly through line 3-3 of FIG. 1, according to an embodiment of the present disclosure.

FIG. 3 illustrates an axial cross-sectional view of the heated hose assembly 10 through line 3-3 of FIG. 1, according to an embodiment of the present disclosure. The hose extension segment 56 and the hose return segment 64 may generate heat at two different spots where they contact an inner wall 90 of the flexible hose 12. As shown, the heating element 50 may include an interior heating wire 92 covered by an extruded cover 94. The extruded cover 94 ensures that the heating wires 92 within the hose extension segment 56 and the hose return segment 64 are separated from one another. As such, the heat generated within the hose extension segment 56 and the hose return segment 64 may be prevented from being concentrated at one spot. The extruded cover 94 provides spacing between the hose extension segment 56 and the hose return segment 64 that distributes the generated heat within the flexible hose, and prevents undesired spot concentrations of heat.

The heating wire 92 may be encased within the extruded cover 94 in order to expand the physical cross-section of the heating element 50, provide electrical insulation, and allow use of an adhesive to be applied thereto in order to seal entrance and exit points of the heating element 50 with respect to the main body 32 of the heating element introducer 30.

As shown in FIG. 3, the flexible hose 12 may include the tubular inner wall 90 that defines a portion of the water channel 80. The inner wall 90 may be formed of flexible plastic, rubber, or the like.

An outer sheath 96 may surround the inner wall 90. The outer sheath 96 may be formed of a stiffer plastic or rubber and is configured to protect the inner wall 90 from damage. Alternatively, the flexible hose 12 may not include the outer sheath 96.

Referring to FIGS. 2 and 3, as described above, the heating element 50 includes segments that loop back such that the two segments 56 and 64 are within the flexible hose 12. Alternatively, the heating element 50 may include only a single extension segment that passes through the flexible hose 12. For example, the heating element introducer 30 may introduce the heating element 50 into the flexible hose 12, and a distal end or tip of the heating element 50 may be securely fastened, such as through adhesives, bonding, tying, or the like, to a restraint, such as the restraint 60, or even an interior wall portion of the hose coupling 18. Further, the lead wire segment 52 may be introduced into the main body 32 of the heating element introducer 30 at a portion of the introducer coupling 36, for example. Accordingly, a heating element may extend from the introducer coupling 36 to the hose coupling 18 such that a distal tip of the heating element secures within, and/or to a portion of, the hose coupling 18.

Alternatively, the heating element 50 may include more or less loops than shown in FIG. 2. For example, the heating element 50 may include multiple loops such that three or more segments of the heating element 50 pass through the flexible hose 12.

Figure 4:
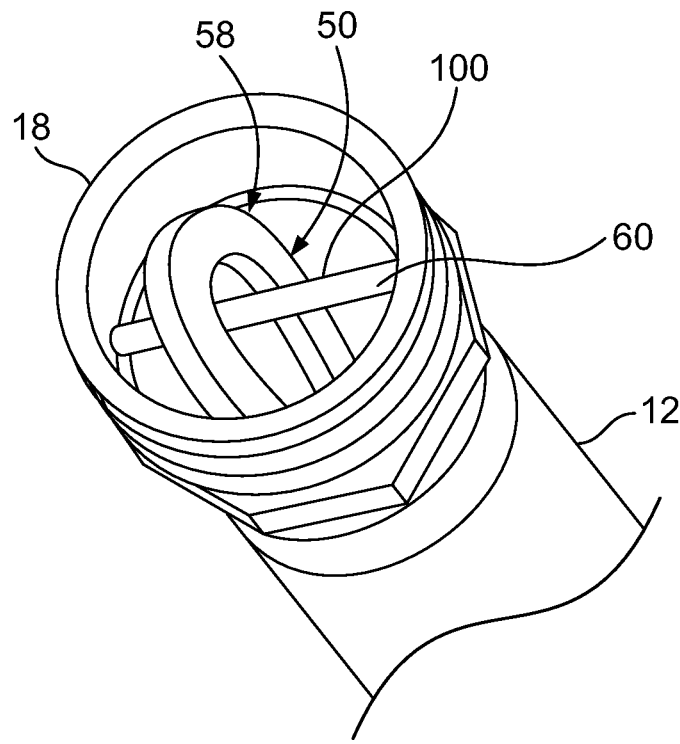
FIG. 4 illustrates a perspective view of a heating element within a coupling of a flexible hose, according to an embodiment of the present disclosure.

FIG. 4 illustrates a perspective view of the heating element 50 within the first hose coupling 18 of the flexible hose 12, according to an embodiment of the present disclosure. As shown, the restraint 60 may be in the form of a pin that spans an inner diameter of the first hose coupling 18. The coupling loop segment 58 securely loops around an outer shaft 100 of the restraint 60.

Figure 5:
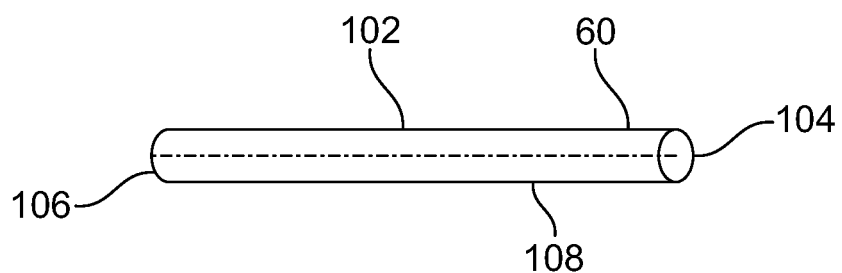
FIG. 5 illustrates a perspective view of a restraint, according to an embodiment of the present disclosure.

FIG. 5 illustrates a perspective view of the restraint 60, according to an embodiment of the present disclosure. The restraint 60 may be a pin having a linear shaft 102 with opposing ends 104 and 106. The restraint 60 may have a central, longitudinal linear axis 108 that extends through the shaft 102 between the ends 104 and 106. An outer portion of the shaft 102 may be cylindrical, for example. However, the shaft 102 may include various other axial cross-sections, such as square, triangular, elliptical, and the like. As noted above, the restraint 60 may be fixed within the first hose coupling.

Figure 6:
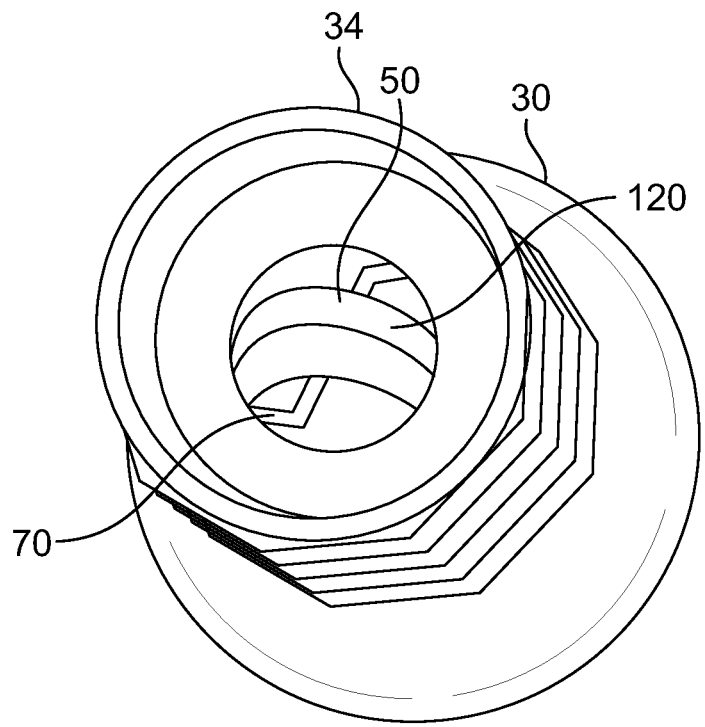
FIG. 6 illustrates a perspective view of a heating element within a coupling of a heating element introducer, according to an embodiment of the present disclosure.

FIG. 6 illustrates a perspective view of the heating element 50 within the second introducer coupling 34 of the heating element introducer 30, according to an embodiment of the present disclosure. As shown, the heating element 50 may include segments 120 that loop around the restraint 70, which may be fixed within the second introducer coupling 34.

Figure 7:
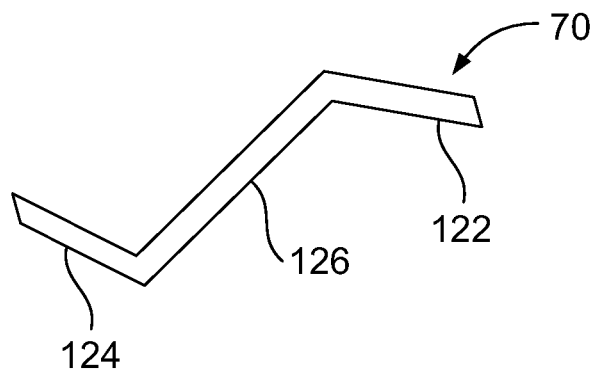
FIG. 7 illustrates a perspective view of a restraint, according to an embodiment of the present disclosure.

FIG. 7 illustrates a perspective view of the restraint 70, according to an embodiment of the present disclosure. The restraint 70 may be an S-pin or hook having canted ends 122 and 124 connected by an intermediate shaft 126. The restraint 70 may be sized and shaped as shown in order to compress the restraint 70 to insert into a coupling. When the compressive force is released, the canted ends 122 and 124 expand to at-rest positions within the coupling, thereby securing the restraint 70 therein. The canted ends 122 and 124 may be compressed between portions of the heated hose assembly 10 to securely fix the restraint 70 in position.

Alternatively, instead of the restraint 70, a restraint 60 such as shown in FIG. 5 may be used. Moreover, the restraint 70 may be used in place of the restraint 60. Also, alternatively, various other restraints, such as securing clips, hooks, rings, barbs, clasps, or the like may be used in place of the restraints 60 and 70.

Figure 8:
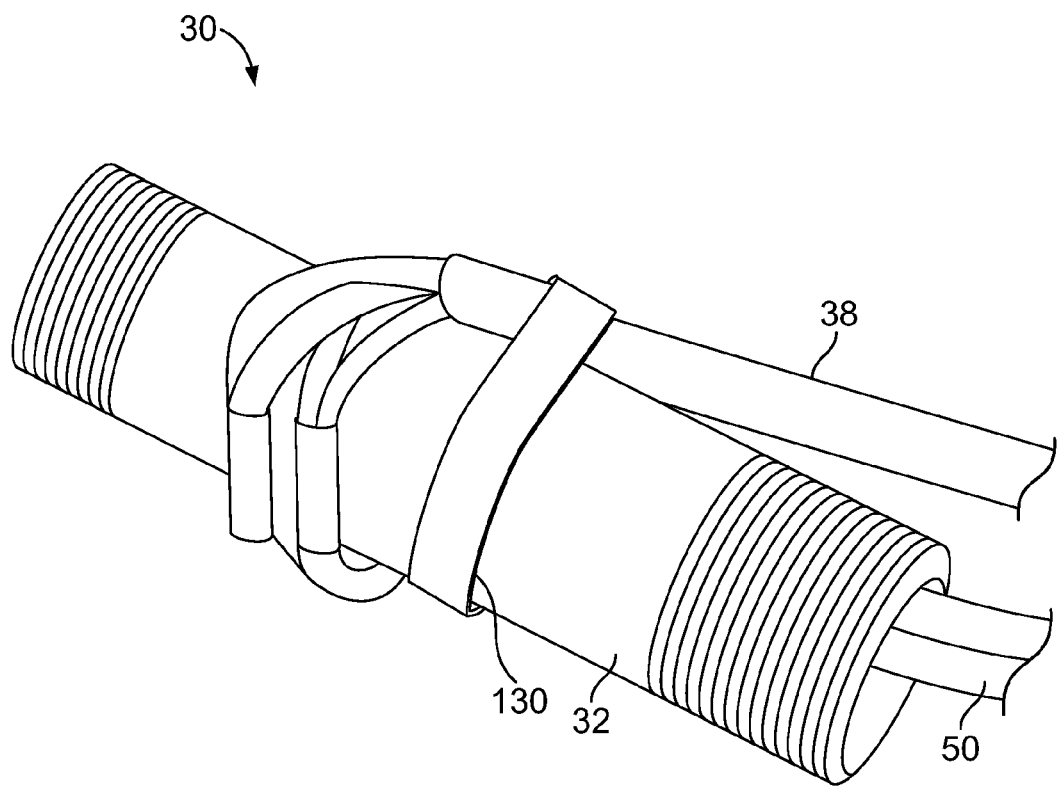
FIG. 8 illustrates a perspective view of a main body of a heating element introducer, according to an embodiment of the present disclosure.

FIG. 8 illustrates a perspective view of the main body 32 of the heating element introducer 30, according to an embodiment of the present disclosure. The main body 32 includes an outer housing 130, which may include an adhesive layer that adhesively seals any openings between the outer housing 130 and the lead wire 38. The outer housing 130 may be a rigid piece of plastic, such as a polyvinyl chloride (PVC) pipe nipple, for example.

Figure 9:
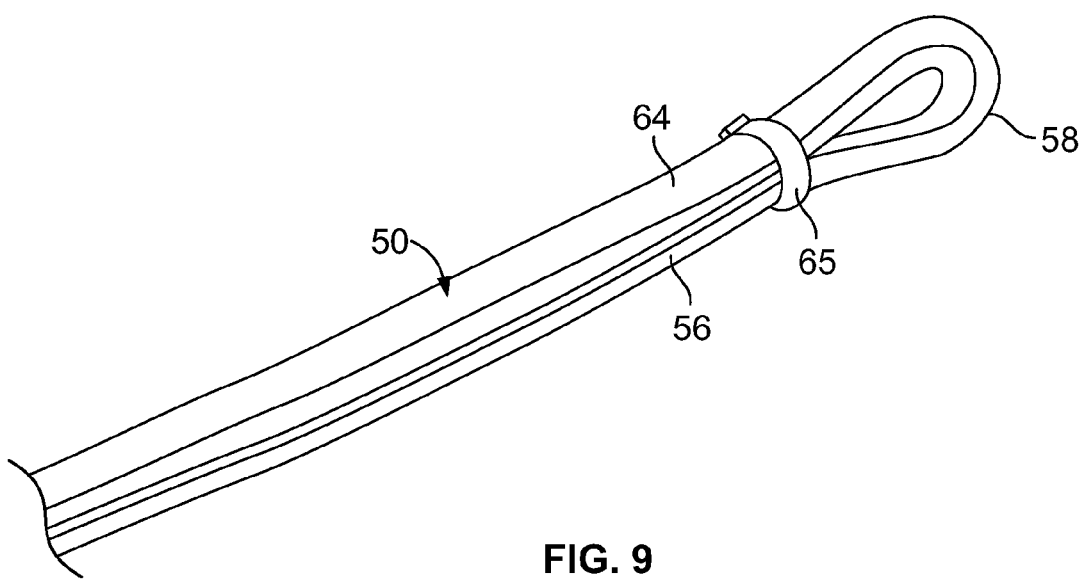
FIG. 9 illustrates a perspective view of a coupling loop segment of a heating element, according to an embodiment of the present disclosure.

FIG. 9 illustrates a perspective view of the coupling loop segment 58 of the heating element 50, according to an embodiment of the present disclosure. The securing member 65 may be a wire tie that is tightened and cinched around portions of the segments 56 and 64 to form the coupling loop segment 58.

Referring to FIGS. 1-9, embodiments of the present disclosure provide a heating element that lies within a water channel of a heated hose assembly. The heating element may enter the water channel through a side of a main body of a heating element introducer, extend through a flexible hose, and double back to the heating element introducer. Embodiments of the present disclosure provide a heating element that extends to each end coupling of a flexible hose, thereby allowing an entire length of the flexible hose, including the couplings, to be heated.

The heating element may be encased within a flexible extrusion that passes twice through the water channel. By routing the heating element through the flexible hose twice, the total heat load is divided between each pass of the heating element, thereby reducing by half the amount of heat at any point of contact between the heating element and the interior wall of the flexible hose. As such, more heat may be supplied to the interior of the hose with less possibility of the portions of the hose melting. Further, by routing the heating element past the ends of the flexible hose and into the couplings, heat is supplied to the couplings, thereby reducing or preventing the possibility of the couplings freezing.

While various spatial and directional terms, such as top, bottom, lower, mid, lateral, horizontal, vertical, front, and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings without departing from its scope. While the dimensions, types of materials, and the like described herein are intended to define the parameters of the disclosure, they are by no means limiting and are exemplary embodiments. Many other embodiments will be apparent to those of skill in the art upon reviewing the above description. The scope of the disclosure should, therefore, be determined with reference to the appended claims, along with the full scope of equivalents to which such claims are entitled. In the appended claims, the terms "including" and "in which" may be used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A heated hose assembly comprising:
    a flexible hose defining an internal water channel and including first and second hose couplings secured to first and second ends, respectively, wherein the first end is opposite the second end;
    a heating element extending from the first hose coupling to the second hose coupling through the flexible hose, wherein the heating element is configured to heat the first and second hose couplings and the flexible hose;
    a heating element introducer secured to one of the first or second hose couplings, wherein the heating element introducer introduces the heating element into the flexible hose;
    an introducing lead wire segment within the heating element introducer, wherein the introducing lead wire segment is configured to heat the heating element introducer;
    an introducing coupling segment that passes through the first hose coupling, wherein the introducing coupling segment is configured to heat the first hose coupling;
    a hose extension segment that passes through the flexible hose, wherein the hose extension segment is configured to heat the flexible hose;
    a coupling loop segment secured proximate to or within the second hose coupling, wherein the coupling loop segment is configured to heat the second hose coupling;
    a hose return segment that passes through the flexible hose, wherein the hose return segment is configured to heat the flexible hose;
    a coupling return segment that passes through the first hose coupling, wherein the coupling return segment is configured to heat the first hose coupling;
    a lead wire return segment within the heating element introducer, wherein the lead wire return segment is configured to heat the heating element introducer; and
    a first restraint within the second hose coupling, wherein the coupling loop segment loops around the first restraint.

2. The heated hose assembly of claim 1, wherein the heating element extends through at least a portion of the heating element introducer, and wherein the heating element is configured to heat the heating element introducer.

3. The heated hose assembly of claim 1, wherein the heating element introducer comprises a main body and an introducer couplings, wherein the main body removably secures to the second hose coupling to securely connect the heating element introducer to the flexible hose.

4. The heated hose assembly of claim 3, wherein the introducer coupling is configured to securely connect to a source of water.

5. The heated hose assembly of claim 1, wherein the first restraint comprises a linear longitudinal pin that spans an inner diameter of the second hose coupling.

6. The heated hose assembly of claim 1, wherein the heating element comprises an interior heating wire and a ground wire covered by an extruded cover.

7. A heated hose assembly comprising:
    a flexible hose defining an internal water channel and including first and second hose couplings secured to first and second ends, respectively, wherein the first end is opposite the second end;
    a heating element introducer secured to one of the first or second hose couplings, wherein the heating element introducer comprises a main body removably securable to the second hose coupling to securely connect the heating element introducer to the flexible hose, and an introducer coupling configured to securely connect to a source of water;
    a heating element introduced into the flexible hose by the heating element introducer, wherein the heating element extends from the first hose coupling to the second hose coupling through the flexible hose, wherein the heating element is configured to heat the first and second hose couplings, the flexible hose, and the heating element introducer; and a first restraint within the second hose coupling, wherein the coupling loop segment loops around the first restraint.

8. The heated hose assembly of claim 7, wherein the heating element comprises:
   an introducing lead wire segment within the heating element introducer, wherein the introducing lead wire segment is configured to heat the heating element introducer;
   an introducing coupling segment that passes through the first hose coupling, wherein the introducing coupling segment is configured to heat the first hose coupling;
   a hose extension segment that passes through the flexible hose, wherein the hose extension segment is configured to heat the flexible hose;
   a coupling loop segment secured proximate to or within the second hose coupling, wherein the coupling loop segment is configured to heat the second hose coupling;
   a hose return segment that passes through the flexible hose, wherein the hose return segment is configured to heat the flexible hose;
   a coupling return segment that passes through the first hose coupling, wherein the coupling return segment is configured to heat the first hose coupling; and
   a lead wire return segment within the heating element introducer, wherein the lead wire return segment is configured to heat the heating element introducer.

9. The heated hose assembly of claim 7, wherein the heating element comprises an interior heating wire and a ground wire covered by an extruded cover.

10. A heated hose assembly comprising:
    a flexible hose defining an internal water channel and including first and second hose couplings secured to first and second ends, respectively, wherein the first end is opposite the second end;
    a heating element introducer secured to one of the first or second hose couplings, wherein the heating element introducer comprises a main body removably secureable to the second hose coupling to securely connect the heating element introducer to the flexible hose, and an introducer coupling is configured to securely connect the heating element introducer to a source of water;
    a heating element including an interior heating wire covered by an extruded cover, wherein the heating element is introduced into the flexible hose by the heating element introducer, wherein the heating element extends from the first hose coupling to the second hose coupling through the flexible hose, wherein the heating element is configured to heat the first and second hose couplings, the flexible hose, and the heating element introducer, wherein the heating element comprises: (i) an introducing lead wire segment within the heating element introducer, wherein the introducing lead wire segment is configured to heat the heating element introducer; (ii) an introducing coupling segment that passes through the first hose coupling, wherein the introducing coupling segment is configured to heat the first hose coupling; (iii) a hose extension segment that passes through the flexible hose, wherein the hose extension segment is configured to heat the flexible hose; (iv) a coupling loop segment secured proximate to or within the second hose coupling, wherein the coupling loop segment is configured to heat the second hose coupling; (v) a hose return segment that passes through the flexible hose, wherein the hose return segment is configured to heat the flexible hose; (vi) a coupling return segment that passes through the first hose coupling, wherein the coupling return segment is configured to heat the first hose coupling; and (vii) a lead wire return segment within the heating element introducer, wherein the lead wire return segment is configured to heat the heating element introducer and the introducer coupling; and
    a first restraint within the second hose coupling, wherein the coupling loop segment loops around the first restraint.

11. A heated hose assembly comprising:
    a flexible hose defining an internal water channel and including at least one hose coupling secured to one of first or second ends of the flexible hose, wherein the first end is opposite the second end; and
    a heating element extending through the flexible hose from the first end to the second end, wherein the heating element is configured to heat the at least one hose coupling and the flexible hose.

12. The heated hose assembly of claim 11, further comprising a heating element introducer secured to one of (i) the at least one hose coupling or (ii) one of the first or second ends of the flexible hose, wherein the heating element introducer introduces the heating element into the flexible hose.

* * * * *